US011214450B1

(12) United States Patent
Pino, Jr.

(10) Patent No.: US 11,214,450 B1
(45) Date of Patent: Jan. 4, 2022

(54) METHOD OF PROOFING AN INNERDUCT/MICRODUCT AND PROOFING MANIFOLD

(71) Applicant: CCIIP LLC, New York, NY (US)

(72) Inventor: Angelo J. Pino, Jr., New York, NY (US)

(73) Assignee: CCIIP LLC, New York, NY (US)

( * ) Notice: Subject to any disclaimer, the term of this patent is extended or adjusted under 35 U.S.C. 154(b) by 0 days.

(21) Appl. No.: 17/218,220

(22) Filed: Mar. 31, 2021

Related U.S. Application Data (60) Provisional application No. 63/159,512, filed on Mar. 11, 2021.

(51) Int. Cl.
  *B65G 51/14* (2006.01)
  *B65G 51/02* (2006.01)
  (Continued)

(52) U.S. Cl.
  CPC ............ *B65G 51/02* (2013.01); *B65H 51/16* (2013.01); *F16L 55/00* (2013.01); *G01M 3/02* (2013.01);
  (Continued)

(58) Field of Classification Search
  CPC ........ B65G 51/02; B65G 53/12; B65G 53/14; B65H 51/16; F16L 7/00; F16L 55/00; H02G 1/083; H02G 1/085; H02G 9/06
  (Continued)

(56) References Cited

U.S. PATENT DOCUMENTS 2,909,975 A * 10/1959 Ulrich .................. G03B 37/005
  396/19
4,016,748 A * 4/1977 Boyens .................... G01H 3/00
  73/40.5 R (Continued)

FOREIGN PATENT DOCUMENTS

CA 2348062 11/2001

OTHER PUBLICATIONS

Camplex FiberOptic Extender, http://www.camplex.com/product.aspx?item=CMX-TACNGO-SDI, Oct. 17, 2017 pp. 1-2.
(Continued)

*Primary Examiner* — Joseph A Dillon, Jr.
(74) *Attorney, Agent, or Firm* — Jeffrey S. Melcher; Melcher Patent Law PLLC (57) ABSTRACT

A proofing air jet having a hollow elongated body having an air outlet and a suction inlet, the air outlet opposing the suction inlet, a pressurized air inlet into the body between the air outlet and the suction inlet, the pressurized air inlet being angled with respect to the hollow elongated body to flow pressurized air in a direction from the pressurized air inlet to the air outlet and provide a suction at the suction inlet, the air outlet having an innerduct/microduct connector for connecting to an opening of the innerduct/microduct, and the suction inlet having a string inlet configured to accept string, and the method further comprising blowing air through the pressurized air inlet into the hollow elongated body and into the innerduct/microduct, wherein the air sucks the string through the string inlet and carries the string through the hollow elongated body and through the innerduct/microduct. A plurality of the proofing air jets can be connected to a manifold. A method of proofing an innerduct/microduct using the proofing air jet to blow a string through the innerduct/microduct.

17 Claims, 9 Drawing Sheets

(51) Int. Cl.
*F16L 55/00* (2006.01)
*G01M 3/02* (2006.01)
*B65H 51/16* (2006.01)

(52) U.S. Cl.
CPC .... *B65H 2553/11* (2013.01); *B65H 2601/261* (2013.01)

(58) Field of Classification Search
USPC .......... 406/144, 197, 198; 226/7, 97.1, 97.4; 405/183.5
See application file for complete search history.

(56) References Cited

U.S. PATENT DOCUMENTS

| | | | |
|---|---|---|---|
| 4,434,861 A | 3/1984 | Howeth | |
| 4,668,548 A | 5/1987 | Lankard | |
| 4,715,747 A * | 12/1987 | Behrens | H02G 1/086 134/22.11 |
| 4,744,693 A | 5/1988 | Smith | |
| 4,812,078 A | 3/1989 | Rivard | |
| 4,856,937 A * | 8/1989 | Grocott | F17D 5/00 405/183.5 |
| 4,991,006 A * | 2/1991 | Wood | G01M 3/005 348/84 |
| 5,244,304 A | 9/1993 | Weil | |
| 5,639,183 A * | 6/1997 | Griffioen | E21B 7/18 254/134 |
| 5,759,454 A * | 6/1998 | Le Gac | G02B 6/4483 228/148 |
| 5,790,476 A * | 8/1998 | Stenstrom | E03F 7/00 367/120 |
| 5,884,384 A * | 3/1999 | Griffioen | F16L 1/028 29/468 |
| 5,895,176 A * | 4/1999 | Puttman | E21B 19/06 405/184 |
| 5,913,638 A | 6/1999 | Lansdale | |
| 6,862,945 B2 * | 3/2005 | Chapman | F16L 55/26 73/865.8 |
| 6,916,992 B1 * | 7/2005 | Ortiz | H02G 1/081 174/135 |
| 7,914,618 B1 | 3/2011 | Krozel | |
| 8,353,347 B2 * | 1/2013 | Mason | H01C 3/00 166/302 |
| 8,746,370 B2 * | 6/2014 | Montgomery | E21B 7/046 175/75 |
| 9,203,226 B2 | 12/2015 | Miller | |
| 9,485,468 B2 | 11/2016 | Pino | |
| 9,824,433 B2 * | 11/2017 | Olsson | H04N 5/23206 |
| 10,009,582 B2 * | 6/2018 | Olsson | H04N 5/2253 |
| 10,311,102 B2 | 6/2019 | Pino | |
| 10,434,547 B2 * | 10/2019 | Turner | B65H 75/364 |
| 10,571,045 B2 | 2/2020 | Pino | |
| 10,571,047 B2 | 2/2020 | Pino | |
| 10,641,414 B2 | 5/2020 | Pino | |
| 10,704,935 B2 * | 7/2020 | Waters | G01F 1/28 |
| 10,823,931 B2 * | 11/2020 | Nitsche | F17D 3/01 |
| 2002/0040731 A1 * | 4/2002 | Beals | G02B 6/4464 137/317 |
| 2003/0070841 A1 * | 4/2003 | Merecka | E21B 7/04 175/19 |
| 2004/0149174 A1 | 8/2004 | Farrington | |
| 2005/0036749 A1 | 2/2005 | Vogel | |
| 2005/0189127 A1 | 9/2005 | Martin | |
| 2005/0258411 A1 * | 11/2005 | Zeitler | H02G 1/086 254/134.3 FT |
| 2007/0269271 A1 * | 11/2007 | Smith, II | F16L 55/24 405/183.5 |
| 2010/0148138 A1 * | 6/2010 | Baker | F16L 7/00 254/134.3 R |
| 2012/0146324 A1 * | 6/2012 | Keyes | F16L 59/21 285/187 |
| 2013/0011198 A1 | 1/2013 | Pichler | |
| 2013/0284070 A1 | 10/2013 | Dubey | |
| 2015/0125218 A1 | 5/2015 | Gustavsson | |
| 2016/0369610 A1 | 12/2016 | Wright | |
| 2016/0376767 A1 | 12/2016 | Miller | |
| 2017/0110859 A1 * | 4/2017 | Gjerull | F16L 55/46 |
| 2018/0106015 A1 | 4/2018 | Pino | |
| 2018/0156357 A1 | 6/2018 | Pino | |
| 2018/0274204 A1 * | 9/2018 | Costello | E02D 17/00 |
| 2018/0292027 A1 | 10/2018 | Pino | |
| 2019/0086002 A1 | 3/2019 | Pino | |
| 2019/0199073 A1 * | 6/2019 | Ohana | B25F 5/00 |
| 2019/0226603 A1 | 7/2019 | Pino | |
| 2020/0088653 A1 * | 3/2020 | Martin | G01M 3/246 |

OTHER PUBLICATIONS

Corning Fiber Optic Extenders, https://www.corning.com/worldwide/en/products/communication-networks/products/fiber.html,Oct. 17, 2017 pp. 1-7.
SC Polymer, https://www.surecretedesign.com/product/liquid-concrete-polymer/, Oct. 17, 2017 p. 1.
SCAG Giant VAC, http://www.giant-vac.com/, Oct. 17, 2017pp. 1-2.
DR Power Vacuum, https://www.drpower.com/, Oct. 17, 2017pp. 1-2.
Billy Goat vaccum, www.billygoat.com, Oct. 17, 2017pp. 1-2.
Ditch Witch, www.ditchwitch.com, Oct. 17, 2017p. 1.
Trenchers, www.vermeer.com,Oct. 17, 2017 pp. 1-15.
Trenchers, www.samarais.com, Oct. 17, 2017pp. 1-2 .
King, "Google Fiber finishes digging very shallow grave in Louisville, KY. #RIP," https:/lwww.pocketables.com/2019/021 Joogle-fiber-finishes-digging-very-shallow-grave-in-louisville-ky-rip.html, published on Pocketable on Feb. 7, 2019, pp. 1-9.
Blum, "Microtrenching fail drives Google Fiber out of Louisville," https:/lwww.tellusventure.com/blog/microtrenching-ail-drives-google-fiber-out-of-louisville/, published on Tellus Venture Associates, Feb. 8, 2019, pp. 1-3.
Otts, "Where is Google Fiber? Mostly in the Highlands, records show," hllps://www.wdrb.com/news/business/sunday- 3edition-where-is-google-fiber-moslly-in-the-highlands/article _ 569112e0-421 e-58ef-be24-c2e42e5e53d2.html, published in the Sunday Edition, WDRB, Sep. 14, 2018, pp. 1-10.
FASTRACT 400 material data sheet Aug. 23, 2018, pp. 1-4.
https://www.youtube.com/watch?v=0CGi92UK4Tw, Optic Fiber nastro in Torino, published Mar. 7, 2016, Garbin Group, pp. 1-3.
https://www.youtube.com/watch?v=klWIuvLc5cl, The Ditch Witch MT12 MicroTrencher: Faster, Cleaner, Better, published Jun. 14, 2016, pp. 1-4.
https://www.youtube.com/watch?v=VWryq2nOA3U, Micro trenching | MTT-system, published Sep. 26, 2016, www.mttsystem.com, pp. 1-3.
https://www.youtube.com/watch?v=7xf2Ujax9hU, published Nov. 10, 2011, Micro-Trenching—alternative Möglichkeit zur Verlegung von Glasfaserkabeln, Schmidt@buglas.de, pp. 1-3.
https://www.youtube.com/watch?v=OIxA3gqNPkE, BVS-net, microtrenching, published Nov. 29, 2014, www. bvs-net.eu, pp. 1-3.
https://www.youtube.com/watch?v=929vJtv5UxW, www, dellcron.com, published Feb. 10, 2018, pp. 1-3.
https://www.youtube.com/watch?v=8p4xHIwuMhl, Americicom, www. americomtech.com, Microtrenching, published Jun. 10, 2017, pp. 1-3.
https://www.youtube.com/watch?v=57NBkB1y8iM, published Jan. 14, 2014, KNET Micro Trenching Solution, pp. 1-4.
Geophysical Survey Systems, www.geophysical.com/products, pp. 1-23, 2020.
UtilityScan DF, quick start guide, MN72-489, pp. 1-68, pp. 2017-2018.

* cited by examiner

METHOD OF PROOFING AN INNERDUCT/MICRODUCT AND PROOFING MANIFOLD

FIELD OF THE INVENTION

The invention generally relates to a proofing manifold configured to clear and proof an innerduct/microduct and a method a proofing the innerduct/microduct.

BACKGROUND OF THE INVENTION

Horizontal drills are often utilized to cut a small hole for installation of innerduct/microduct below a roadway surface. Examples of horizontal drills include those disclosed in U.S. Patent Publication No. 20030070841 and U.S. Pat. No. 8,746,370.

Buried innerduct/microducts often have obstructions after installation. There is a need for a proofing device to quickly determine the integrity of the innerduct/microduct.

SUMMARY OF THE INVENTION

The invention provides a simple, efficient and fast proofing manifold and method of proofing a buried innerduct/microduct.

The objectives of the invention can be obtained by a method of proofing an innerduct/microduct comprising:
  attaching a proofing air jet to a first open end of a buried innerduct/microduct;
  supplying pressurized air to the proofing air jet;
  supplying a string to the proofing air jet: and
  blowing the string through the proofing air jet, into the buried innerduct/microduct, and out a second open end of the buried innerduct/microduct so that a portion of the string protrudes from the second open end of the buried innerduct/microduct.

The objectives of the invention can be further obtained by a proofing air jet configured to proof a buried innerduct/microduct comprising:
  a hollow elongated body having an air outlet and a suction inlet, the air outlet opposing the suction inlet:
  a pressurized air inlet into the body between the air outlet and the suction inlet, the pressurized air inlet being angled with respect to the hollow elongated body to flow pressurized air in a direction from the pressurized air inlet to the air outlet and provide a suction at the suction inlet;
  the air outlet having an innerduct/microduct connector for connecting to an opening of the innerduct/microduct; and
  the suction inlet having a string inlet configured to accept string.

The objectives of the invention can be further obtained by a proofing manifold configured to proof a buried innerduct/microduct comprising:
  a manifold comprising a manifold body configured to contain pressurized air;
  a manifold pressurized air inlet configured to provide pressurized air to the manifold;
  a plurality of proofing air jet connectors connected to the manifold; and
  a plurality of proofing air jets connected to the plurality of proofing air jet connectors, each proofing air jet comprising:
    a hollow elongated body having an air outlet and a suction inlet, the air outlet opposing the suction inlet:
    a pressurized air inlet into the body between the air outlet and the suction inlet, the pressurized air inlet being angled with respect to the hollow elongated body to flow pressurized air in a direction from the pressurized air inlet to the air outlet and provide a suction at the suction inlet;
    the air outlet having an innerduct/microduct connector for connecting to an opening of the innerduct/microduct; and
    the suction inlet having a string inlet configured to accept string, wherein the pressurized air inlet is connected to one of the proofing air jet connectors.

DETAILED DESCRIPTION OF THE INVENTION

The invention will be explained by reference to the attached non-limiting FIGS. In the description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention. However, it will be apparent to one skilled in the art that the present invention can be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention. All use of the word "example" are intended to describe non-limiting examples of the invention.

To facilitate an understanding of the principles and features of the various embodiments of the present invention, various illustrative embodiments are explained below. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

Figure 1A:
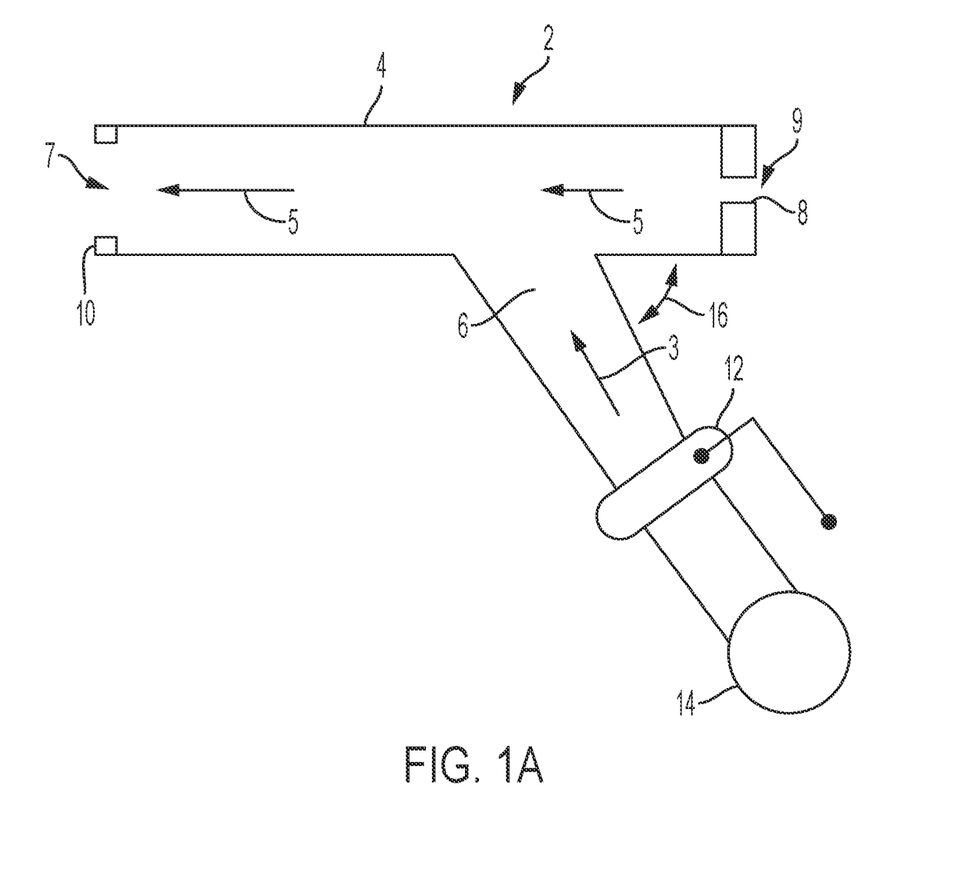
FIG. 1A illustrates a side view of a proofing air jet.
Figure 1B:
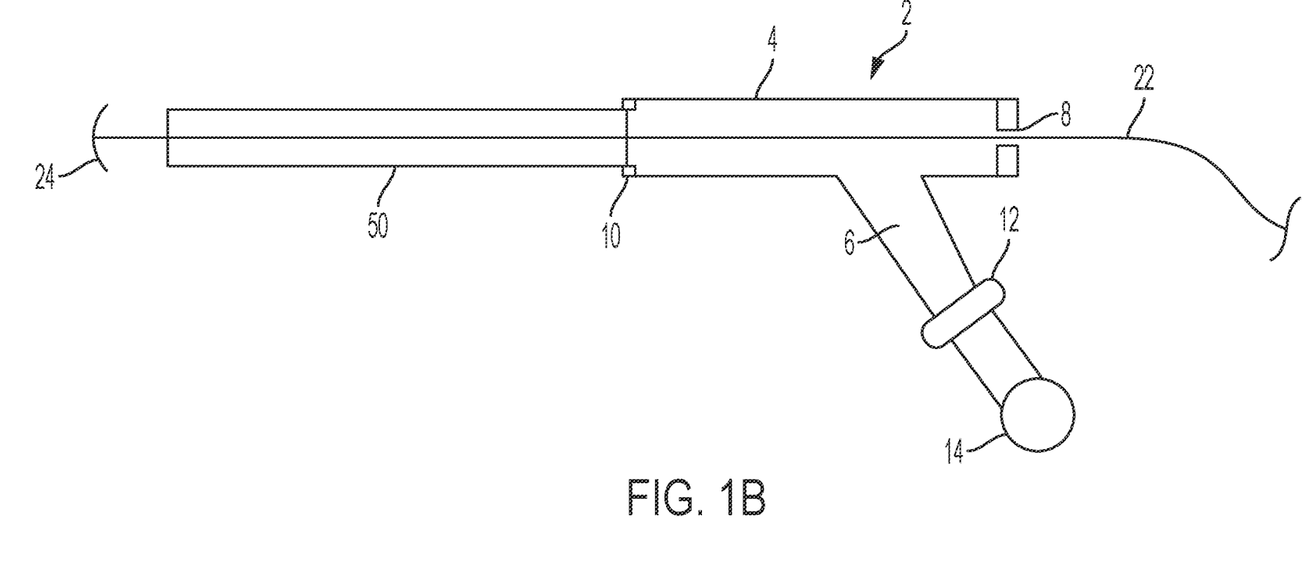
FIG. 1B illustrates a side view of a proofing air jet connected to an innerduct/microduct.

FIGS. 1A and 1B illustrate an example of a proofing air jet 2 configured to proof a buried innerduct/microduct 50. The proofing air jet 2 comprises a hollow elongated body 4 having an air outlet 7, a suction inlet 9 and a pressurized air inlet 6. The air outlet 7 opposes the suction inlet 9. The pressurized air inlet 6 is connected to the hollow elongated body 4 between the air outlet 7 and the suction inlet 9. The pressurized air inlet 6 is angled 16 with respect to the hollow elongated body 4 to flow pressurized air in a direction 3 through the pressurized air inlet 6 into the hollow elongated body 4 to provide an air flow in a direction 5 through the body and out the air outlet 7, which also forms a suction (vacuum) at the suction inlet 9. The air outlet 7 has an innerduct/microduct connector 10 for connecting to an opening of the innerduct/microduct. The suction inlet 9 has a string inlet 8 that is configured to accept string 22.

The hollow elongated body 4 can be formed from any suitable material, such as metal, plastic or composites. An example of a suitable material is polyvinyl chloride (PVC) pipe. The angle 16 between the hollow elongated body 4 and the pressurized air inlet 6 is less than 90°, preferably about 80° to about 20°, and more preferably about 70° to about 30°.

The innerduct/microduct connector 10 can be formed from a flexible material, such as rubber, to form a seal between the hollow elongated body 4 and the opening of the innerduct/microduct 50.

The string inlet 8 can be formed from any suitable material, such as plastic, rubber, or composite. The string inlet 8 has a hole sized to accept the string 22. Examples of suitable sizes include about ⅛ to about ½ inch in diameter, preferably about ⅛ to about ¼ inch in diameter.

FIGS. 2A-D illustrate a plurality of the proofing air jets 2 connected to a manifold 30. The manifold 30 comprises a manifold body 31 that is configured to contain pressurized air. The manifold body 31 preferably has an elongated shape. The manifold body 31 comprises a plurality of proofing air jet connectors 32 and a manifold pressurized air inlet 33. The proofing air jet connector 32 is configured to connect to the pressurized air input 6. An air valve 12 can be provided between the pressurized air input 6 and the manifold body 31 to regulate the air pressure supplied to the pressurized air input 6. The proofing air jet connector 32 provides a rigid connection between the manifold body 31 and the proofing air jet 2. Alternatively, a flexible proofing air jet connector 36 can be used to provide a flexible connection between the proofing air jet 2 and the manifold 31. The flexible proofing air jet connector 36 can comprise a high pressure air hose. Pressurized air connectors are well known in the art and any suitable pressurized air connector can be utilized in the proofing air jet connectors 32 and 36. Preferably, the proofing air jet connectors 32 and 36 utilize well-known pressurized quick release couplings.

FIGS. 3A-3J illustrate examples of the many different types of commercially available innerduct and microduct 50 having various numbers of ducts and various sizes of the ducts. The manifold body 31 has a plurality of proofing air jet connectors 32, 36 spaced apart so that a plurality of proofing air jets 2 can be mounted to the manifold body 31 to match the location and number of ducts in the innerduct/microduct 50 being proofed.

The source of pressurized air 40 can be any suitable air compressor. Air compressors are now well known. The size of the air compress required will depend on the number of proofing air jets 2 being used simultaneously. In general, the greater the number of proofing air jets 2 being used simultaneously the larger the air compressor and greater the air flow required.

Figure 2A:
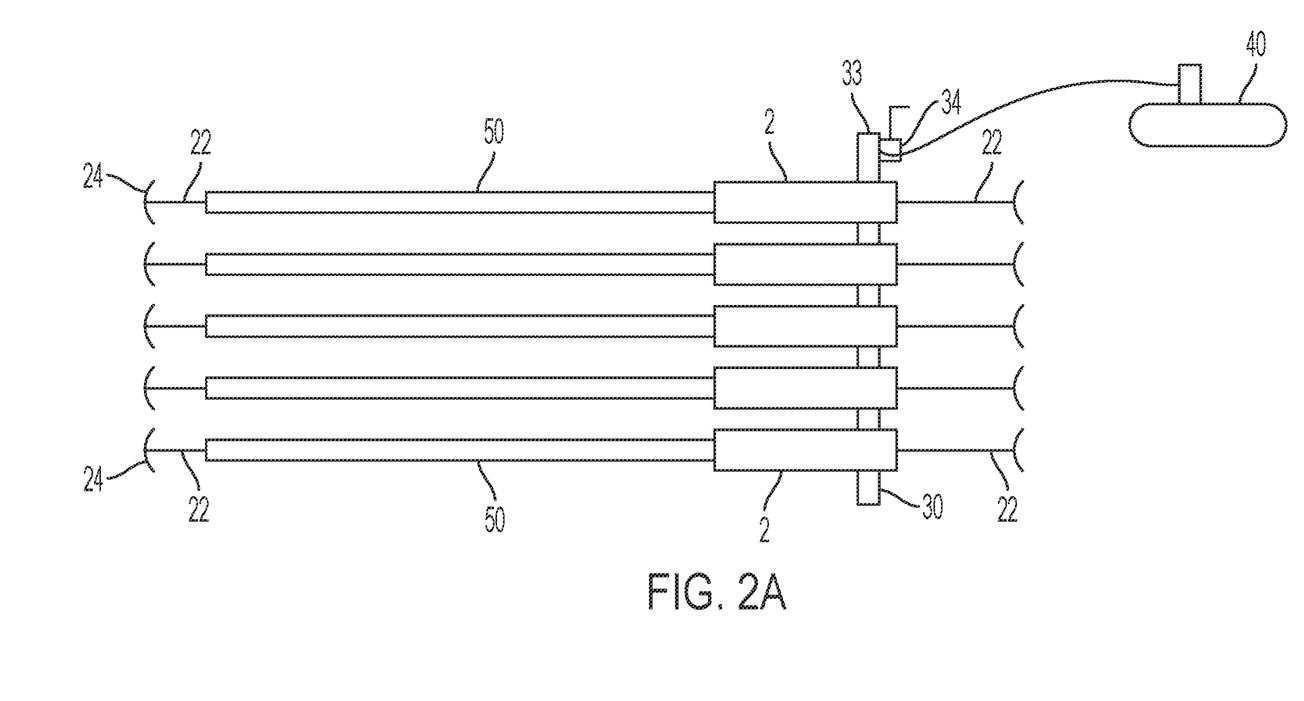
FIG. 2A illustrates a plurality of proofing air jets connected a manifold.
Figure 2B:
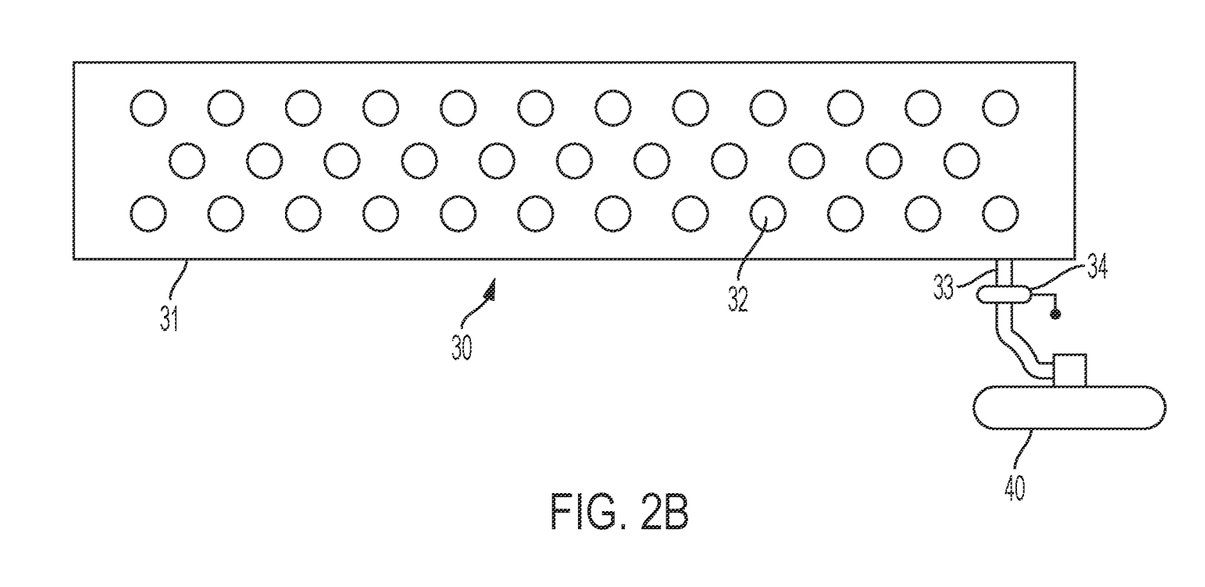
FIG. 2B illustrates a manifold.
Figure 2C:
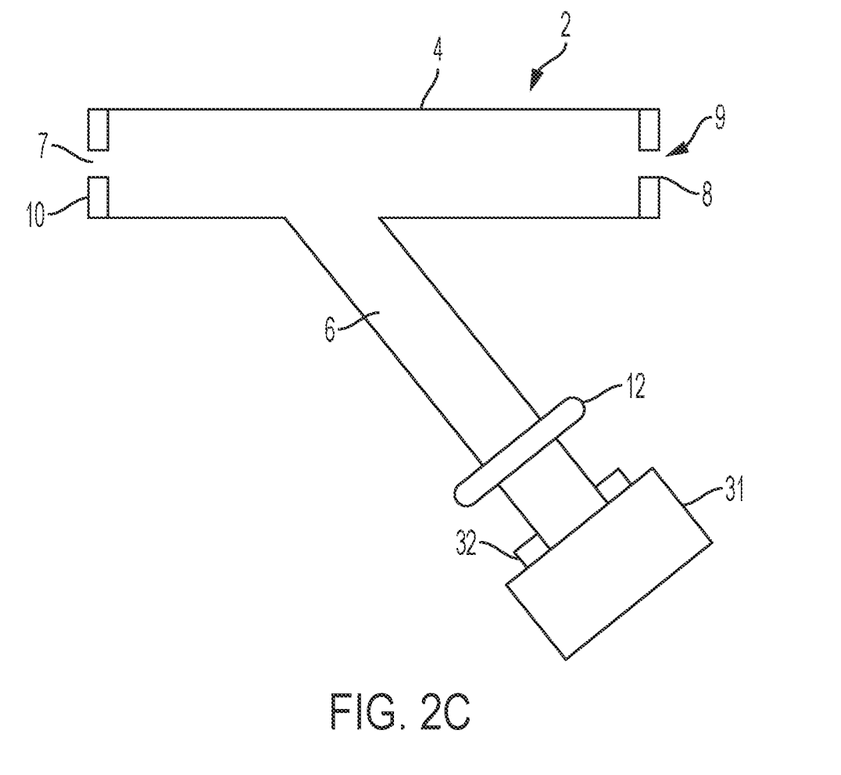
FIG. 2C illustrates a proofing air jet connected to a manifold using a rigid proofing air jet connector.
Figure 2D:
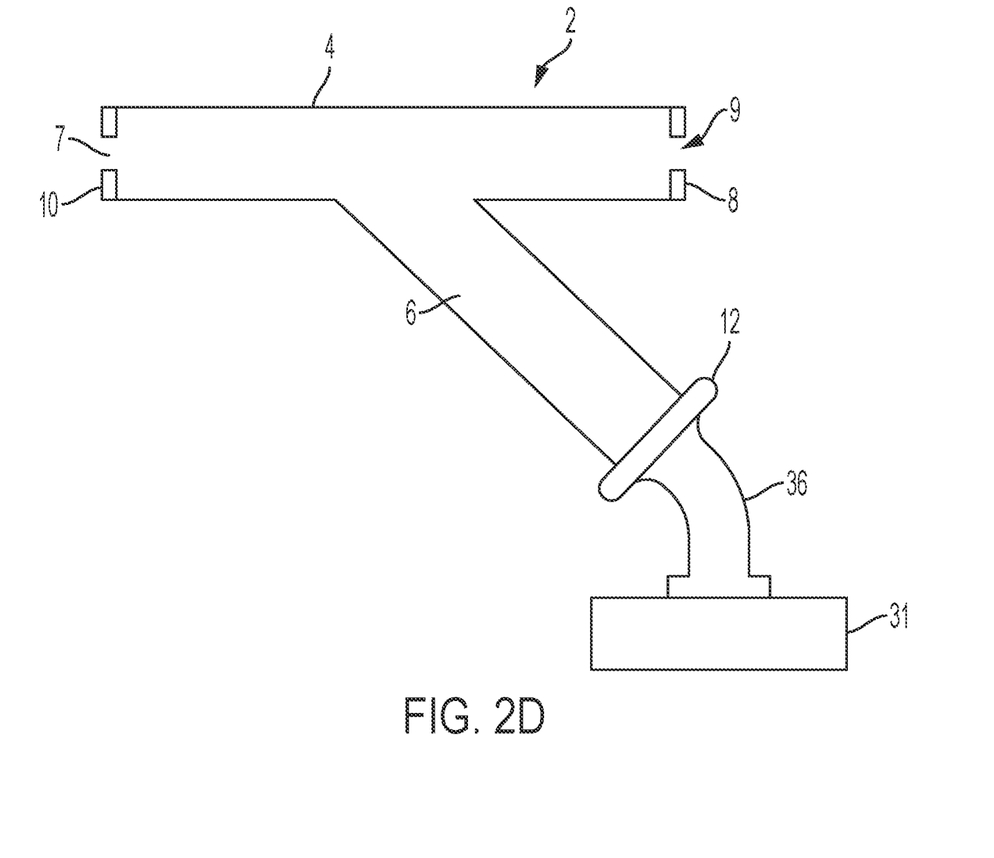
FIG. 2D illustrates a proofing air jet connected to a manifold using a flexible proofing air jet connector.
Figure 2E:
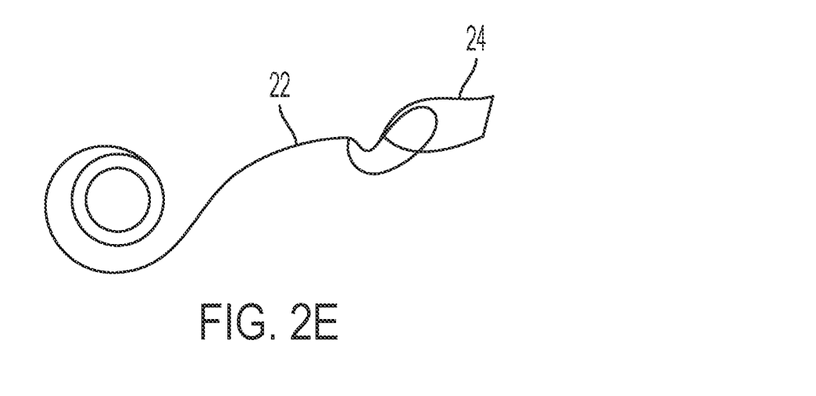
FIG. 2E illustrates a rolled up string 22 having a parachute 24 mounted at an end of the string 22.
Figure 2F:
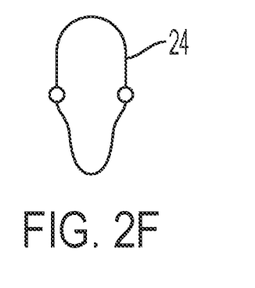
FIG. 2F illustrates a front view of a parachute 24.
Figure 2G:
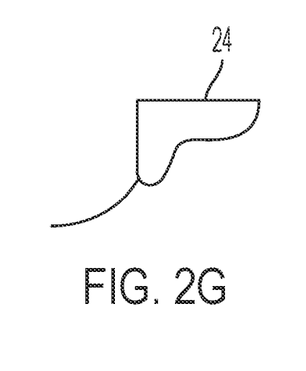
FIG. 2G illustrates a side view of a parachute 24.
Figure 3A:
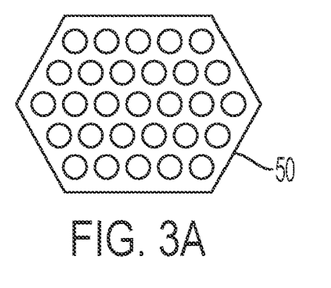
FIGS. 3A, 3B, 3C, 3D, 3E, 3F, 3G, 3H, 3I, and 3J each illustrate a different type of innerduct/microduct.
Figure 3B:
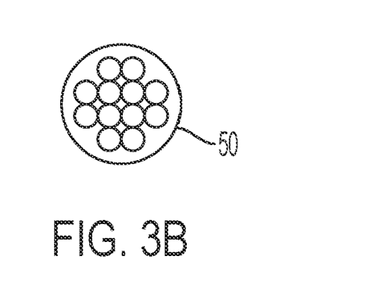
Figure 3C:
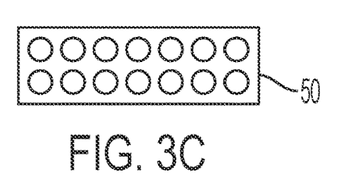
Figure 3D:
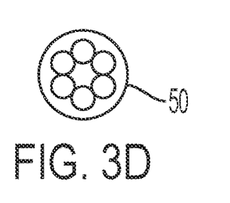
Figure 3E:
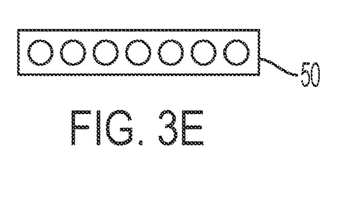
Figure 3F:
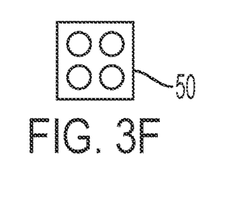
Figure 3G:
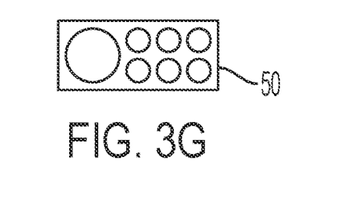
Figure 3H:
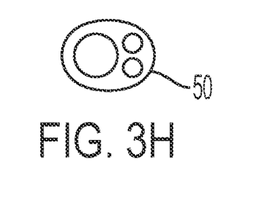
Figure 3I:
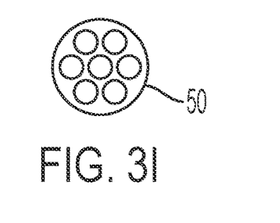
Figure 3J:
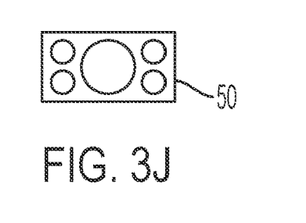

As shown in FIGS. 2E-2G, the string 22 can be stored on reels, stored in a box, or any suitable storage. An end of the string 22 can have a parachute 24 to help pull the string 22 through the innerduct/microduct 50 during proofing. Any desired parachute 24 can be utilized. FIGS. 2E-G shows a parachute 24 formed from a folded piece of fabric tied to the string 22. During proofing, the parachute 24 and string 22 is inserted into the string inlet 8. The air flow 5 through the hollow elongated body 4 and innerduct/microduct 50 pushes against the parachute 24 which pulls the string 22 through the innerduct/microduct 50. If the string 22 is able to penetrate the entire length of the innerduct/microduct 50, then the innerduct/microduct 50 has been proofed, i.e. is free of obstructions. The string 22 installed inside the innerduct/microduct 50 can be used to pull an optical fiber or other small utility through the proofed innerduct/microduct 50.

Figure 4:
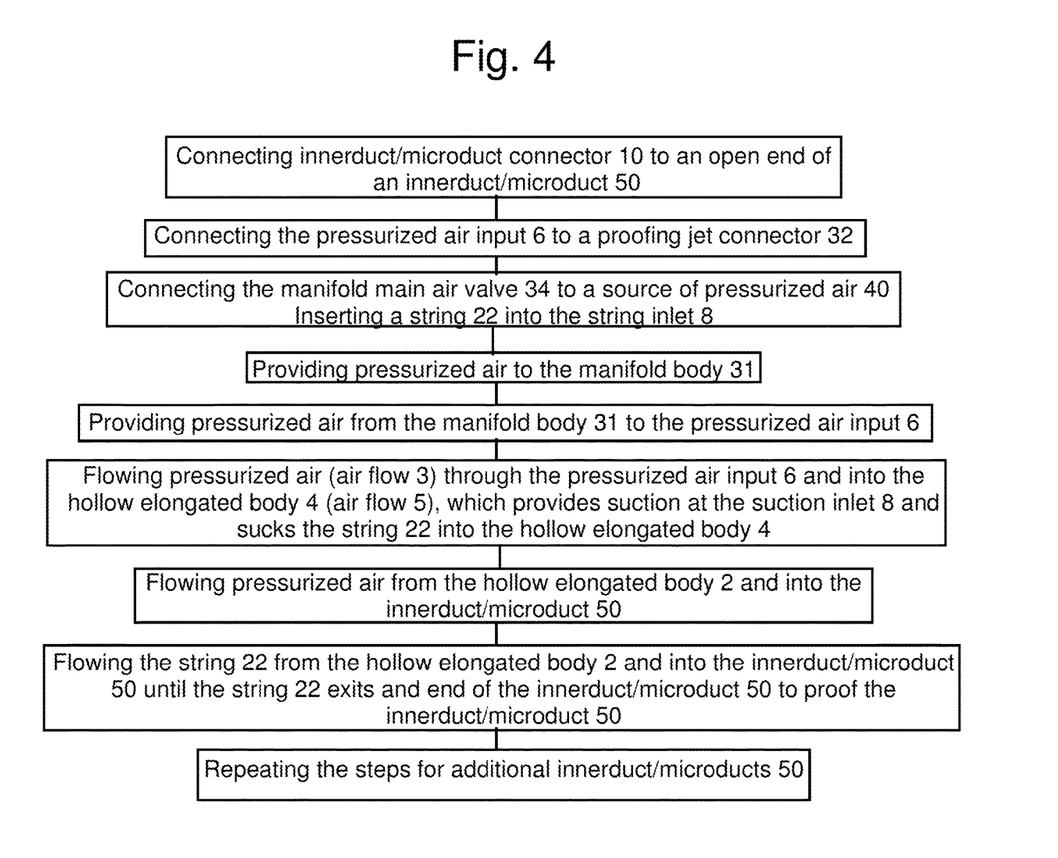
FIG. 4 illustrates a flow chart of a method of proofing an innerduct/microduct.

FIG. 4 illustrates a flow chart of a method of proofing a buried innerduct/microduct. The innerduct/microduct connector 10 is connected to an open end of the innerduct/microduct 50. The pressurized air input 6 is connected to a proofing jet connector 32. The manifold main air valve 34 is connected to a source of pressurized air 40. An end of the string 22 is inserted into the string inlet 8. Pressurized air is supplied to the manifold body 31. Pressurized air is supplied from the manifold body 31 to the pressurized air input 6, thereby flowing pressurized air (air flow 3) through the pressurized air input 6 and into the hollow elongated body 4 (air flow 5), which provides suction at the suction inlet 8 and sucks the string 22 into the hollow elongated body 4. Pressurized air is supplied from the hollow elongated body 2 and into the innerduct/microduct 50, which flows the string 22 from the hollow elongated body 2 and into the innerduct/microduct 50 until the string 22 exits an end of the innerduct/microduct 50 to proof the innerduct/microduct 50.

REFERENCE NUMBERS

2 Proofing air jet
3 Input air flow
4 Hollow elongated body
5 Air flow through hollow elongated body
6 Pressurized air input
7 Air outlet
8 String inlet
9 Suction inlet
10 Innerduct/microduct connector
12 Air valve
14 Manifold connector
16 Angle between the hollow elongated body and the pressurized air input
22 String
24 Parachute
30 Manifold
31 Manifold body
32 Proofing air jet connector
33 Manifold pressurized air inlet
34 Manifold main air valve
36 Flexible proofing air jet connector
40 Source of pressurized air
50 Innerduct/microduct It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention. While the invention has been described to provide an access hole over a buried utility, the invention can be utilized wherever an access hole in the roadway is required.

The invention claimed is:

1. A method of proofing an innerduct/microduct comprising:
attaching a proofing air jet to a first open end of a buried innerduct/microduct;
supplying pressurized air to the proofing air jet;
supplying a string to the proofing air jet: and
blowing the string through the proofing air jet, into the buried innerduct/microduct, and out a second open end of the buried innerduct/microduct so that a portion of the string protrudes from the second open end of the buried innerduct/microduct.

2. The method according to claim 1, further comprising a parachute connected to an end of the string configured to facilitate blowing of the string through the innerduct/microduct.

3. The method according to claim 1, further comprising providing at least one proofing air jet comprising:

a hollow elongated body having an air outlet and a suction inlet, the air outlet opposing the suction inlet:
a pressurized air inlet into the body between the air outlet and the suction inlet, the pressurized air inlet being angled with respect to the hollow elongated body to flow pressurized air in a direction from the pressurized air inlet to the air outlet and provide a suction at the suction inlet;
the air outlet having an innerduct/microduct connector for connecting to an opening of the innerduct/microduct; and
the suction inlet having a string inlet configured to accept string, and the method further comprising blowing air through the pressurized air inlet into the hollow elongated body and into the innerduct/microduct, wherein the air sucks the string through the string inlet and carries the string through the hollow elongated body and through the innerduct/microduct.

4. The method according to claim 1, further comprising providing a proofing manifold configured to proof a buried innerduct/microduct comprising:
a manifold comprising a manifold body configured to contain pressurized air;
a manifold pressurized air inlet configured to provide pressurized air to the manifold;
a plurality of proofing air jet connectors connected to the manifold; and
a plurality of proofing air jets connected to the plurality of proofing air jet connectors, each proofing air jet comprising:
a hollow elongated body having an air outlet and a suction inlet, the air outlet opposing the suction inlet:
a pressurized air inlet into the body between the air outlet and the suction inlet, the pressurized air inlet being angled with respect to the hollow elongated body to flow pressurized air in a direction from the pressurized air inlet to the air outlet and provide a suction at the suction inlet;
the air outlet having an innerduct/microduct connector for connecting to an opening of the innerduct/microduct; and
the suction inlet having a string inlet configured to accept string, wherein the pressurized air inlet is connected to one of the proofing air jet connectors, and
the method further comprising for each of the proofing air jets blowing air from the manifold body into the pressurized air inlet, into the hollow elongated body and into the innerduct/microduct, wherein the air sucks the string through the string inlet and carries the string through the hollow elongated body and through the innerduct/microduct.

5. The method according to claim 4, further comprising a valve connected to the pressurized air inlet configured to control flow of pressurized air through the pressurized air inlet.

6. The method according to claim 4, wherein the proofing air jet connector is flexible.

7. The method according to claim 3, wherein an angle between the hollow elongated body and the pressurized air inlet is less than 90°.

8. The method according to claim 3, wherein an angle between the hollow elongated body and the pressurized air inlet is about 80° to about 20°.

9. The method according to claim 3, wherein an angle between the hollow elongated body and the pressurized air inlet is about 70° to about 30°.

10. The method according to claim 4, wherein an angle between the hollow elongated body and the pressurized air inlet is less than 90°.

11. The method according to claim 4, wherein an angle between the hollow elongated body and the pressurized air inlet is about 80° to about 20°.

12. The method according to claim 4, wherein an angle between the hollow elongated body and the pressurized air inlet is about 70° to about 30°.

13. The method according to claim 4, wherein the proofing air jet connectors match a location and number of ducts in the innerduct/microduct being proofed.

14. The method according to claim 4, wherein a duct in the microduct/innerduct is proofed by the string penetrating an entire length of the duct.

15. The method according to claim 14, further comprising pulling an optical fiber or utility through the proofed duct with the string inside the duct.

16. The method according to claim 14, further comprising a parachute connected to an end of the string that facilitates blowing of the string through the innerduct/microduct.

17. The method according to claim 4, further comprising a parachute connected to an end of the string configured to facilitate blowing of the string through the innerduct/microduct.

\* \* \* \* \*